Jan. 4, 1927.

I. PACKARD 1,613,190

TRANSMISSION MECHANISM

Filed August 17, 1925   3 Sheets-Sheet 1

INVENTOR.

IVAN PACKARD

Jan. 4, 1927.
I. PACKARD
TRANSMISSION MECHANISM
Filed August 17, 1925   3 Sheets-Sheet 2
1,613,190
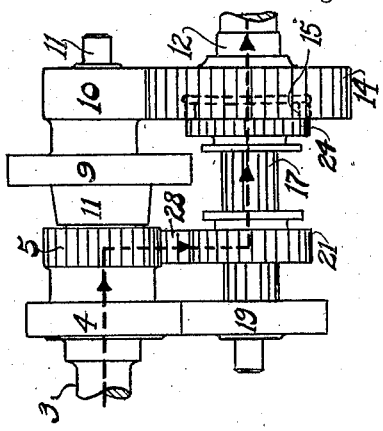
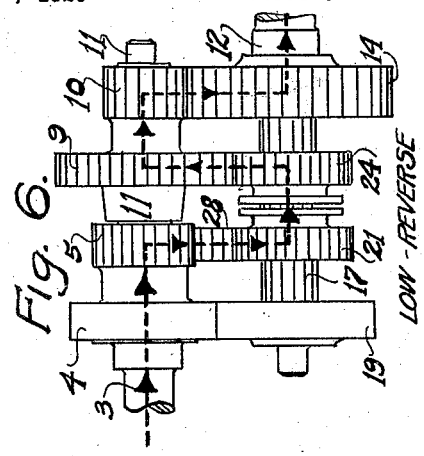
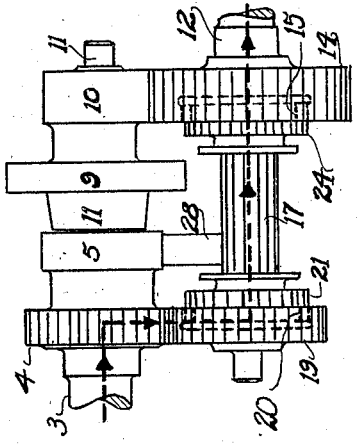
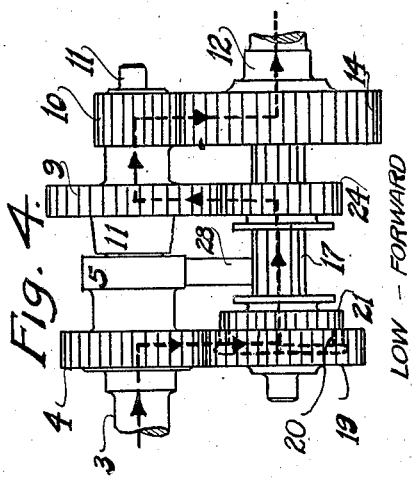
IVAN PACKARD.
INVENTOR.
Ivan Packard Jan. 4, 1927.

I. PACKARD 1,613,190

TRANSMISSION MECHANISM

Filed August 17, 1925   3 Sheets-Sheet 3

INVENTOR.

IVAN PACKARD.

Ivan Packard

Patented Jan. 4, 1927.

1,613,190

UNITED STATES PATENT OFFICE.

IVAN PACKARD, OF DETROIT, MICHIGAN.

TRANSMISSION MECHANISM.

Application filed August 17, 1925. Serial No. 50,754.

This invention aims to provide a transmission mechanism having two speeds in both forward and reverse, and is primarily intended for use on automotive vehicles employed on rails, though the invention may also be advantageously utilized in connection with stationary engines.

It is an object of the invention to provide a transmission mechanism wherein no direct drive is employed; wherein two reverse speeds are obtained with only one reverse idler gear; and wherein two sliding gears, both mounted on the lower transmission shaft, are adapted to slide independently of one another, one to control the direction of and affect the speed of rotation of the driven shaft and the other to affect its speed of rotation, each of these gears being so arranged that when moved to mid position no power is transmitted through them.

With these and other objects in view which will become apparent as the specification proceeds, the invention is hereinafter more fully described with the aid of the accompanying drawings.

Figures 3, 4, 5 and 6 show views of the transmission mechanism in different positions, the path of power transmitted in each case being indicated by a heavy line.

Figure 1:
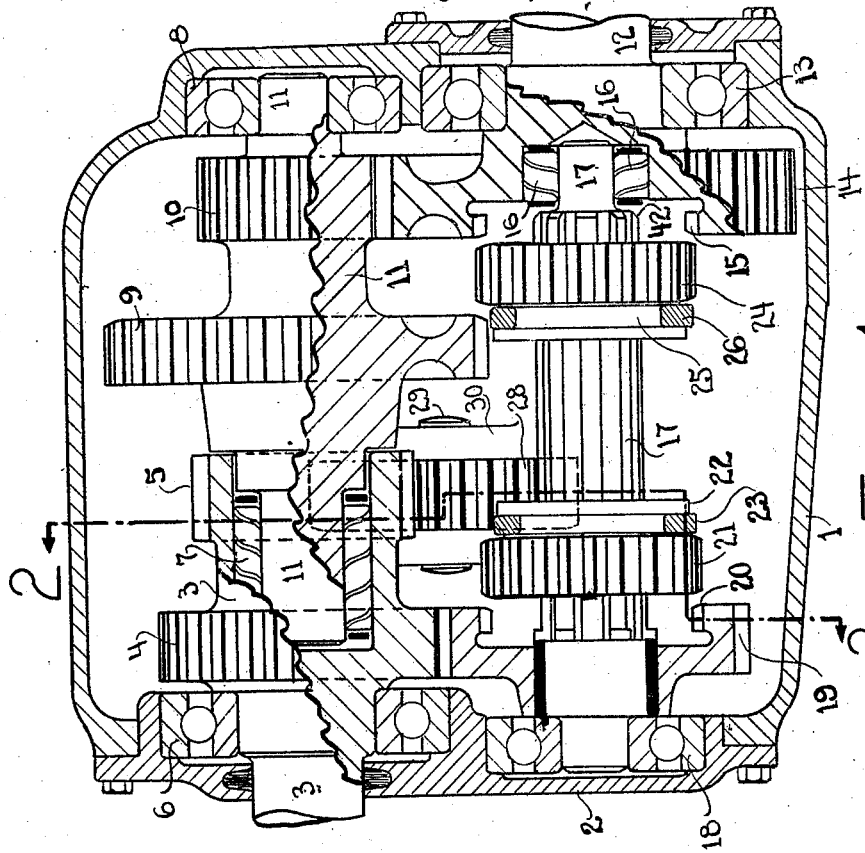
Figure 1 is a longitudinal section through the housing showing part of the transmission in section and part in elevation.
Figure 2:
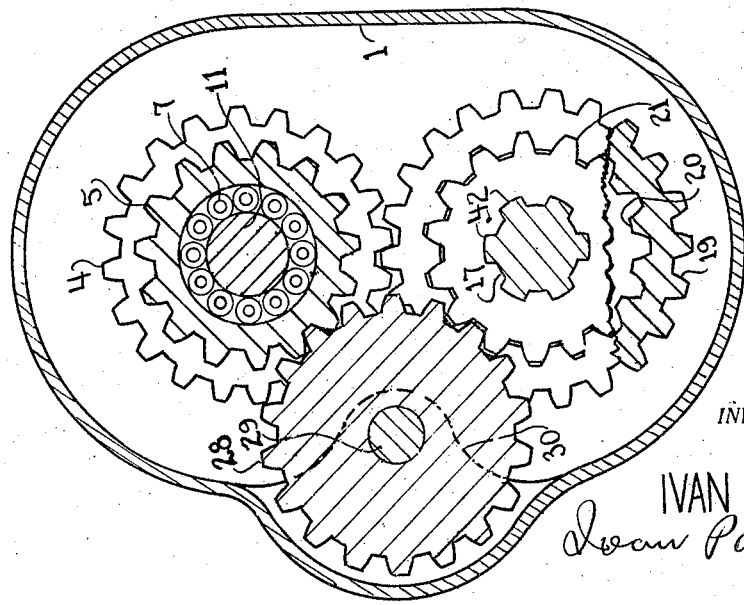
Figure 2 is a section on the line 2—2 of Figure 1.

Referring more particularly to the drawings, 1 designates a housing to which a cover 2 is attached. The latter supports a ball bearing 6 through which the drive shaft 3 passes. Gears 4 and 5 are integral with the shaft 3 and are bored out to receive the roller bearing 7, and the opposite end of the housing carries a ball bearing 8. The upper transmission shaft 11 is mounted in the bearings 7 and 8, and has gears 9 and 10 integral with it.

The driven shaft 12 is mounted in a ball bearing 13 supported by the housing 1, and terminates within the housing in a gear 14 provided with an internal rack 15. The gear 14 is constantly in mesh with the gear 10, and is bored out to receive a roller bearing 16 which supports one end of the lower transmission shaft 17, the opposite end of which is mounted in a ball bearing 18 in the cover 2.

Contiguous to the ball bearing 18 a gear 19 having an internal rack 20 is so mounted on the lower transmission shaft 17 as to be free to rotate independently of the said shaft and is constantly in mesh with the gear 4. 28 is the reverse idler gear which is constantly in mesh with the gear 5, and rotates freely on the shaft 29 supported by lugs 30 integral with the housing 1.

The gear 21, which is slidingly arranged on the lower transmission shaft 17, is adapted to engage either the internal rack 20 of the gear 19 or the reverse idler gear 28; the gears 20 and 28 are so spaced that the sliding gear 21 may be moved to a position between them and not be in contact with either of them.

Similarly the gear 24, which is slidingly arranged on the lower transmission shaft 17, is adapted to engage either the gear 9 integral with the upper transmission shaft 11 or the internal rack 15 of the gear 14; the gears 9 and 14 are so spaced that the sliding gear 24 may be located between them and not be in contact with either of them. 42 indicates splines in the lower transmission shaft 17 on which the gears 21 and 24 slide.

Figures 7, 8:
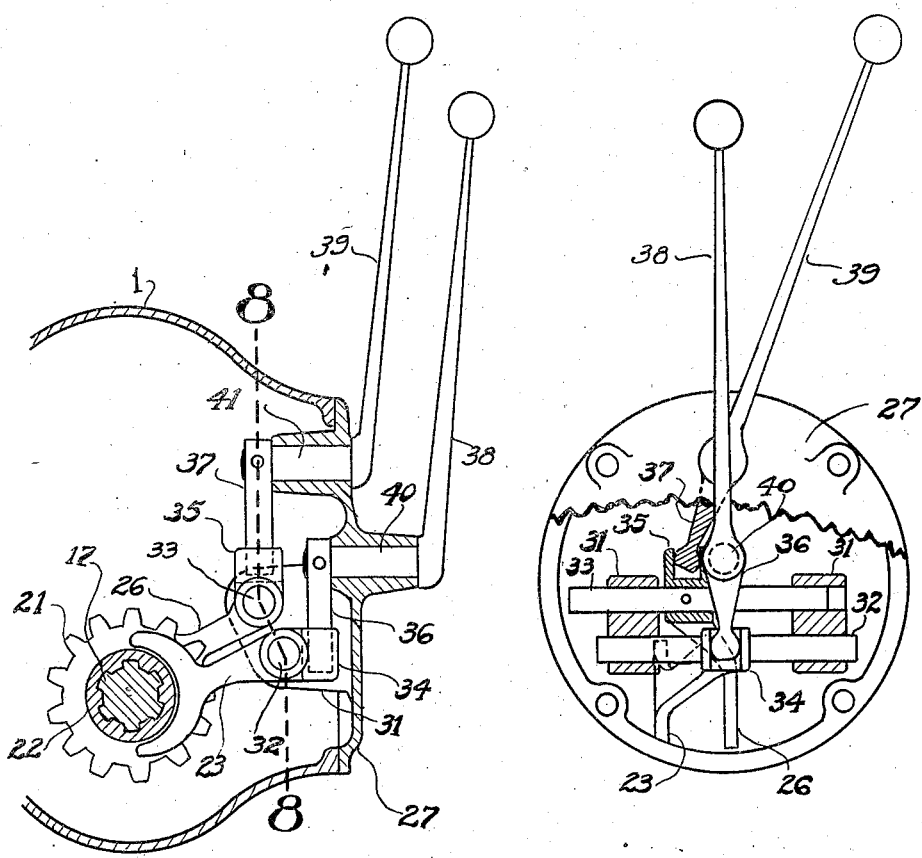
Figure 7 is a cross section through the housing showing the shifter arrangement.
Figure 8 is a section on the line 8—8 of Figure 7.

The sliding gears 21 and 24 have hubs 22 and 25 which are engaged by gear shifters 23 and 26 respectively. On the inner surface of the gear shift plate 27 (see Fig. 7) are bearings 31 which support the shafts 32 and 33 to which the gear shifters 23 and 26 are secured. The shifters 23 and 26 have sockets 34 and 35 which are engaged by members 36 and 37 connected to the lower ends of the levers 38 and 39 by pins 40 and 41. When the lever 38 is vertical the gear 21 is in neutral position; when the lever is moved towards the right the gear 21 engages the internal rack 20 with the result that the lower transmission shaft 17 revolves in such a direction that forward rotation may be imparted to the driven shaft, and when the lever 38 is moved towards the left the gear 21 engages the reverse idler gear 28 with the result that the lower transmission shaft 17 revolves in such a direction that backward rotation may be imparted to the driven shaft. In either of the latter cases no actual rotation of the driven shaft 12 will occur as long as the lever 39 remains in upright or neutral position. In order that power may be transmitted the latter lever must either be moved to the right or left. In the former case the sliding gear 24 will mesh with the gear 9 and a slow speed of rotation of the driven shaft will occur, or in the latter case the sliding gear 24 will engage the rack 15, in which event the rotation of the lower transmission shaft will be directly imparted to the driven shaft 12 and the latter will be driven at high speed.

From Figures 3, 4, 5 and 6 the path of power transmitted can be clearly seen. For high speed forward the power travels through the gears 4 and 19, the rack 20 and sliding gear 21, and the sliding gear 24 and rack 15. For slow speed forward through the gears 4 and 19, the rack 20 and the sliding gear 21, the sliding gear 24 and gear 9, and the gears 10 and 14. For high speed reverse through the gears 5, 28, and 21, and through the sliding gears 24 and rack 15. For slow speed reverse through the gears 5, 28, and 21, the sliding gear 24 and gear 9, and through the gears 10 and 14.

From the foregoing it will be noted that one sliding gear controls the direction of rotation of the driven shaft and affects its speed of rotation and the other sliding gear affects its speed of rotation, and that although two gear shift levers are provided it is only necessary to operate one of them unless both the speed and direction are to be changed. Moreover all the gears on the upper transmission shaft are fixed as also are the gears on the ends of the drive and driven shafts.

While the preferred embodiment of the invention has been described and shown, it is understood that the construction is subject to such changes as fall within the scope of the appended claims.

What I claim as my invention and desire to secure by Letters Patent is:

1. A transmission mechanism comprising a drive shaft having fixed gears thereon, a driven shaft having a fixed gear thereon, an upper transmission shaft having fixed gears thereon, one of which latter is constantly in mesh with the gear on the driven shaft, a lower transmission shaft having a gear thereon free to rotate independently of its shaft and constantly in mesh with one of the gears on the drive shaft, a reverse idler gear mounted on an independent shaft and constantly meshing with the other gear on the drive shaft, a sliding gear on the lower transmission shaft adapted to cooperate either with the free gear on said shaft or with the reverse idler gear, and a second sliding gear on said lower transmission shaft adapted to coact either with one of the fixed gears on the upper transmission shaft or with the gear on the driven shaft, said sliding gears being adapted to be moved longitudinally independently of each other.

2. A transmission mechanism comprising a drive shaft, upper and lower transmission shafts, a driven shaft, fixed gears on the drive shaft, the upper transmission shaft, and the driven shaft, a reverse idler gear on an independent shaft, a gear on the lower transmission shaft free to rotate independently of its shaft, and two sliding gears on the lower transmission shaft, said gear wheels being adapted for various relative positions to transmit power from the drive shaft to the driven shaft at different speeds when rotating the driven shaft in the same direction as the drive shaft or in the opposite direction.

3. A transmission mechanism as described in claim 2, wherein the two sliding gears are adapted to move longitudinally on the lower transmission shaft independently of each other.

4. A transmission mechanism as described in claim 2, wherein one of the sliding gears controls the direction and affects the speed of rotation of the driven shaft, and the other sliding gear also affects its speed of rotation.

IVAN PACKARD.